United States Patent
Dietz et al.

(10) Patent No.: US 9,628,328 B2
(45) Date of Patent: Apr. 18, 2017

(54) NETWORK CONTROLLER WITH INTEGRATED RESOURCE MANAGEMENT CAPABILITY

(71) Applicant: Rackspace US, Inc., San Antonio, TX (US)

(72) Inventors: Matthew Charles Dietz, San Antonio, TX (US); Jason Kölker, Live Oak, TX (US); Trey Eugene Morris, Spring, TX (US)

(73) Assignee: Rackspace US, Inc., San Antonio, TX (US)

( * ) Notice: Subject to any disclaimer, the term of this patent is extended or adjusted under 35 U.S.C. 154(b) by 174 days.

(21) Appl. No.: 13/843,729

(22) Filed: Mar. 15, 2013

(65) Prior Publication Data
US 2014/0279862 A1 Sep. 18, 2014

(51) Int. Cl.
*H04L 12/24* (2006.01)
*H04L 29/12* (2006.01)

(52) U.S. Cl.
CPC ...... *H04L 41/0806* (2013.01); *H04L 41/0886* (2013.01); *H04L 61/103* (2013.01); *H04L 61/2007* (2013.01); *H04L 61/2038* (2013.01); *H04L 61/2061* (2013.01); *H04L 61/6022* (2013.01)

(58) Field of Classification Search
CPC ............ H04L 41/0886; H04L 61/2061; H04L 61/2038; H04L 61/6022; H04L 61/2007; H04L 61/103; H04L 41/0806
See application file for complete search history.

(56) References Cited

U.S. PATENT DOCUMENTS

| | | | |
|---|---|---|---|
| 7,788,345 B1* | 8/2010 | Sukiman et al. | 709/220 |
| 8,650,273 B2* | 2/2014 | Lambert | G06F 9/45533 709/223 |
| 2007/0211737 A1* | 9/2007 | Rose | H04L 12/4625 370/401 |
| 2009/0292858 A1* | 11/2009 | Lambeth et al. | 711/6 |
| 2011/0093849 A1* | 4/2011 | Chawla et al. | 718/1 |
| 2011/0142053 A1* | 6/2011 | Van Der Merwe et al. | 370/395.1 |
| 2012/0222028 A1* | 8/2012 | Nakajima et al. | 718/1 |
| 2012/0297037 A1* | 11/2012 | Kumagai et al. | 709/222 |
| 2013/0100798 A1* | 4/2013 | Zeng | H04L 12/4641 370/218 |
| 2013/0148669 A1* | 6/2013 | Noguchi et al. | 370/401 |
| 2013/0177022 A1* | 7/2013 | Caffrey | H04L 12/467 370/395.53 |
| 2013/0232278 A1* | 9/2013 | Zou et al. | 709/245 |
| 2014/0223434 A1* | 8/2014 | Mulligan et al. | 718/1 |

* cited by examiner

*Primary Examiner* — Robert Beausoliel, Jr.
*Assistant Examiner* — Arthur Ganger
(74) *Attorney, Agent, or Firm* — Haynes and Boone, LLP

(57) ABSTRACT

A system for providing network control and resource management includes a database storing a plurality of network resources. The system also includes a network controller that receives a request for a network resource. The network controller may include an resource manager that determines, based on the request, a set of available network resources from the plurality of network resources. The resource manager may provide the set of available network resources to a client and update the database based on providing the set of available network resources.

20 Claims, 4 Drawing Sheets

NETWORK CONTROLLER WITH INTEGRATED RESOURCE MANAGEMENT CAPABILITY

BACKGROUND

The present disclosure relates generally to cloud computing, and more particularly to a network management.

Cloud computing services can provide computational capacity, data access, networking/routing and storage services via a large pool of shared resources operated by a cloud computing provider. Because the computing resources are delivered over a network, cloud computing is location-independent computing, with resources being provided to end-users on demand with control of the physical resources separated from control of the computing resources.

Originally the term cloud came from a diagram that contained a cloud-like shape to contain the services that afforded computing power that was harnessed to get work done. Much like the electrical power we receive each day, cloud computing is a model for enabling access to a shared collection of computing resources—networks for transfer, servers for storage, and applications or services for completing work. More specifically, the term "cloud computing" describes a consumption and delivery model for IT services based on the Internet, and it typically involves over-the-Internet provisioning of dynamically scalable and often virtualized resources. This frequently takes the form of web-based tools or applications that a user can access and use through a web browser as if it were a program installed locally on the user's own computer. Details are abstracted from consumers, who no longer have need for expertise in, or control over, the technology infrastructure "in the cloud" that supports them. Cloud computing infrastructures may consist of services delivered through common centers and built on servers. Clouds may appear as single points of access for consumers' computing needs, and may not require end-user knowledge of the physical location and configuration of the system that delivers the services.

The cloud computing utility model is useful because many of the computers in place in data centers today are underutilized in computing power and networking bandwidth. A user may briefly need a large amount of computing capacity to complete a computation for example, but may not need the computing power once the computation is done. The cloud computing utility model provides computing resources on an on-demand basis with the flexibility to bring the resources up or down through automation or with little intervention.

DETAILED DESCRIPTION

Figure 1:
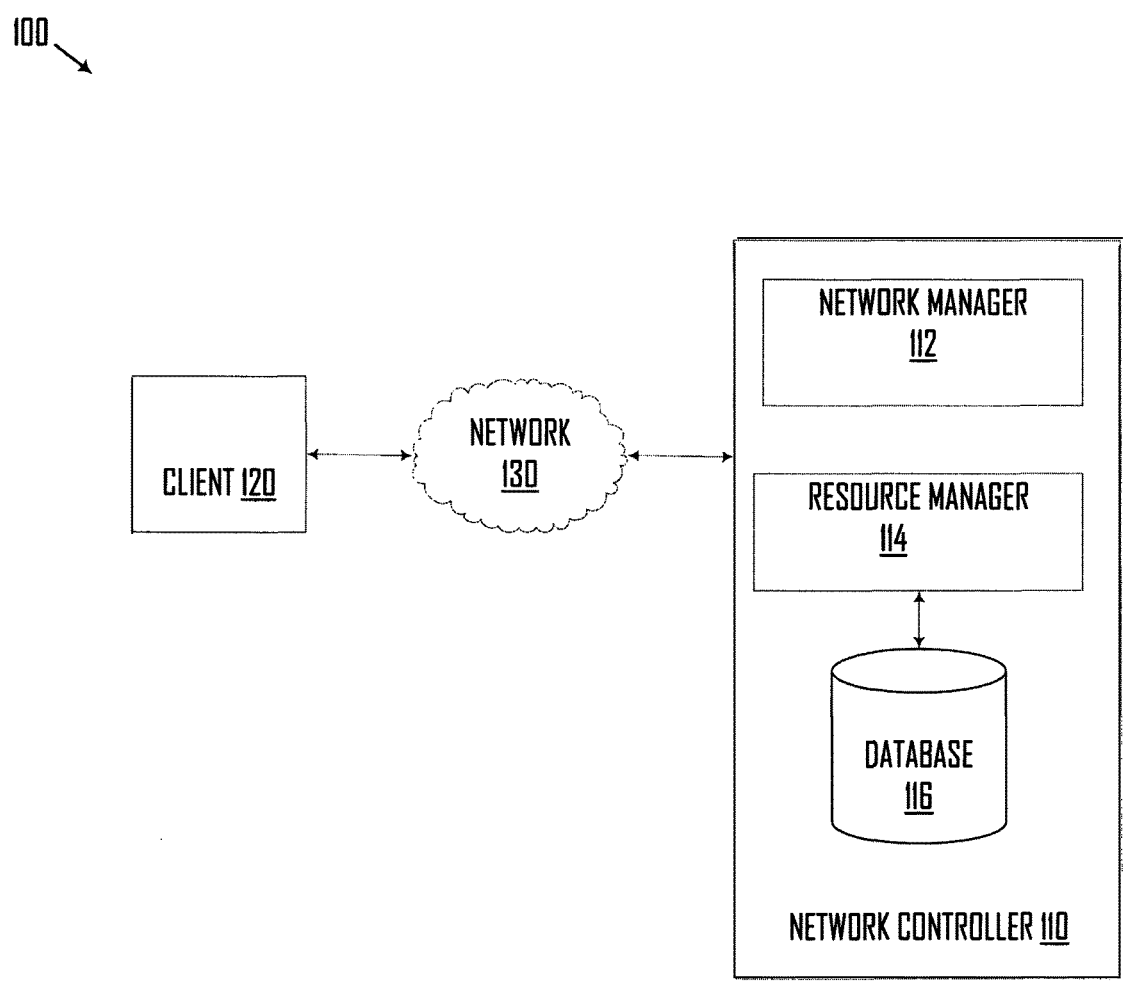
FIG. 1 is a simplified block diagram illustrating a system for providing network control and resource management, according to an embodiment.

I. Overview
II. Example System Architecture
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Network resources may be assigned to local physical nodes on a network. As networks become more virtualized and as cloud deployments increase, network resources may be assigned to remote and virtual machines, not only to local physical nodes on the network. It may be advantageous to maintain data associated with network resources.

A cloud operating system may work as a part of a cloud computing architecture designed to allow control and management of pools of resources accessible by various components of the system. Control and utilization of these resources may be abstracted at multiple levels through various components of the system. A network controller may provide a virtual network service in the system. In an example, the network controller may a tenant to dynamically request and configure a virtual network.

The network controller may provide a software layer that controls the networking portion of an Infrastructure as a Service (IaaS) cloud computing platform. In an example, the network controller may provide a tenant-facing API that exposes logical abstractions for consuming network services as well as backend implementations of those APIs in order to provide the underlying functionality. The network controller may provide tenant control of networking topology and addressing. In an example, the network controller provides a "plugin" mechanism to enable different technologies and implements calls to these technologies via the API. This may enable users and administrators to pick and choose the networking technologies that are right for them.

Tenants of cloud computing systems may desire the ability to create rich enterprise network topologies. The network controller may allow cloud tenants to: (i) create multitier networks (e.g., web tier, app tier, database tier); (ii) control Internet Protocol (IP) addressing; (iii) insert and configure services such as firewalls and intrusion prevention systems; and (iv) implement virtual private networks (VPNs) and bridges to remote physical hosting solutions or customer premises. Further, the network controller may allow tenants and cloud service providers the ability to deploy and manage state-of-the-art network systems through the provisioning of virtual networking resources The network controller may be operably connected to and configured to work in conjunction with one or more other components of the system, including, but not limited to, one or more storage components, one or more computing components, one or more administrative components (e.g., dashboard components), one or more shared service components, or any combination thereof. As such, the network controller may work in connection with numerous other components to provide an entire IaaS platform.

Further, the cloud computing architecture may also include a network information service that provides a centralized mechanism for creating, reading, updating, and deleting network information such as Internet Protocol (IP) addresses and media access control (MAC) addresses.

Networks may increasingly be able to span multiple services and multiple locations/geographies. Accordingly, it may be desirable to allocate and track IP addresses, MAC addresses, and other types of network information, especially network information that needs to be unique across services.

In an embodiment, a system for providing network control and resource management includes a database that stores a plurality of network resources and a network controller that receives a request for a network resource. The network controller may include a resource manager that determines, based on the request, a set of available network resources from the plurality of network resources. The network controller may provide the set of available network resources to the client and update the database accordingly. The network controller may also associate the network resource with a node in the network.

II. Example System Architecture

Referring now to FIG. 1, an embodiment of a system 100 for providing network control and resource management is illustrated. System 100 includes a network controller 110 and a client 120 connected to a network 130. Each of network controller 110 and client 120 may communicate with each other over network 130.

Network 130 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Network controller 110 may provide network resources to client 110 and associate network resources with client 110. Network controller 110 includes a network manager 112 and a resource manager 114. Resource manager 114 may maintain data associated with physical, virtual, and cloud networks. In FIG. 1, resource manager 114 is coupled to a database 116 that stores data associated with one or more network resources. While database 116 is depicted as a component in network controller 110, database 116 may be external to network controller 110.

Database 116 may store a pool of available and assigned network resources. Database 116 may also store data other than data associated with network resources. In an example, resource manager 114 may allocate network resources for a node and associate one or more of the allocated network resources with the node. The node may be a component that can communicate with another component over a network. In an example, the node is a virtual machine, physical server, router, or switch.

Examples of a network resource are an IP address block, IP address, subnet, port, and media access control (MAC) address. An IP address space may be organized into IP blocks, and IP blocks may be broken into IP ranges. Each IP range may be associated with a network and may be selected from an allocation pool of IP addresses. The IP addresses in the IP ranges may be allocated to devices on the network. An IP address may be, for example, an IPv4 address or an IPv6 address. This is not intended to be limiting and other versions of the IP are within the scope of this disclosure.

In an example, the IP addresses in the IP ranges may be allocated to devices on the network. In an example, database 116 includes an IP allocation table including IP address assignments to particular instances (e.g., virtual machines instance), and client identification numbers, MAC addresses, ports, and subnets associated with the assignments. Resource manager 114 may assist in maintaining routing tables that are used to forward packets to their final destination addresses. In an embodiment, database 116 includes sufficient data to recreate the routing tables. This may be advantageous if problems with the network occur and wipe out the routing information.

Further, network controller 110 may be given a context associated with an IP address (e.g., MAC address associated with the IP address, the virtual machine (VM) identifier to which the IP address is assigned, etc.). For example, based on a given network resource, resource manager 114 may determine other information associated with the given network resource. In an example, resource manager 114 may determine the MAC address associated with a given IP address, or other information. Network controller 110 may also determine which IP addresses and MAC addresses are allowed to receive and transmit traffic on a particular port. In an example, network controller 110 may be able to associate IP addresses to particular clients and to network segments. Accordingly, this may provide advantages because it may be unnecessary for network controller 110 to query another service for these details.

Network controller 110 may receive a request for a network resource. In an embodiment, network manager 112 is an application programming interface (API), and network controller 110 receives the request for a network resource via network manager 112. Network manager 112 may be a layer between network controller 110 and resource manager 114 that helps with the communication between network controller 110 and resource manager 114. In an example, to launch a VM, client 120 invokes via network manager 112 the API and passes a set of parameters including a desired state of the VM. In another example, client 120 may specify in the set of parameters a desired type of network (e.g., private or public). Client 120 may also specify a network name to which client 120 would like the VM to connect. Network manager 112 may receive this information and communicate it to resource manager 114. In another embodiment, resource manager 114 may have its own API that client 120 may invoke to launch the VM.

The following is a description of a network resource being an IP address. This description applies as well to other network resources such as subnet, port, and media access control (MAC) address. In an example, the network resource that network controller 110 provides in response to the request is a set of IP addresses. Resource manager 114 may determine, based on the request for the network resource, a set of available IP addresses from the plurality of IP addresses stored in database 116. Database 116 may include a set of available IP addresses and a set of unavailable IP address. An IP address may be unavailable if, for example, the IP address has already been assigned. Resource manager 114 may search database 116 for available IP addresses and identify the set of available IP addresses.

The request for the network resource may be associated with a node. In an example, the node is a VM that the client desires to launch. After resource manager 114 identifies an available IP address (e.g., from the identified set of available IP addresses), network controller 110 may associate one or more of the available IP address with the node such that the node may be located by the IP address. By incorporating resource manager 114 into network controller 110, it may be unnecessary for client 120 to send two different requests to receive a set of available network resources (e.g., IP addresses) and associate one or more of the set of available network resources with the node. This may provide an advantage of speed and less power consumption and enable client 120 to obtain the set of available network resources (e.g., IP addresses) and have the network resources (e.g., IP addresses) associated with the node based upon a single request. Further, this also reduces the traffic sent over the network.

Additionally, an embodiment may allow for authentication of network changes closer to network controller 110 and without having to query multiple components over network 130. Network controller 110 may have the data of interest already in database 116. This may be advantageous in bursting situations when a high quantity of VMs is requested.

In an example, network controller 110 may provide the set of available IP addresses to the client and update the database based on providing the set of available IP addresses to the client. For example, network controller 110 may indicate in the database that the set of IP addresses that were provided to the client is no longer available. When the node associated with the IP address is removed from the network, the IP address associated with the node may be returned to a pool of available IP addresses. Accordingly, the IP address that was associated with the node may be reassigned at a later point in time.

Figure 2:
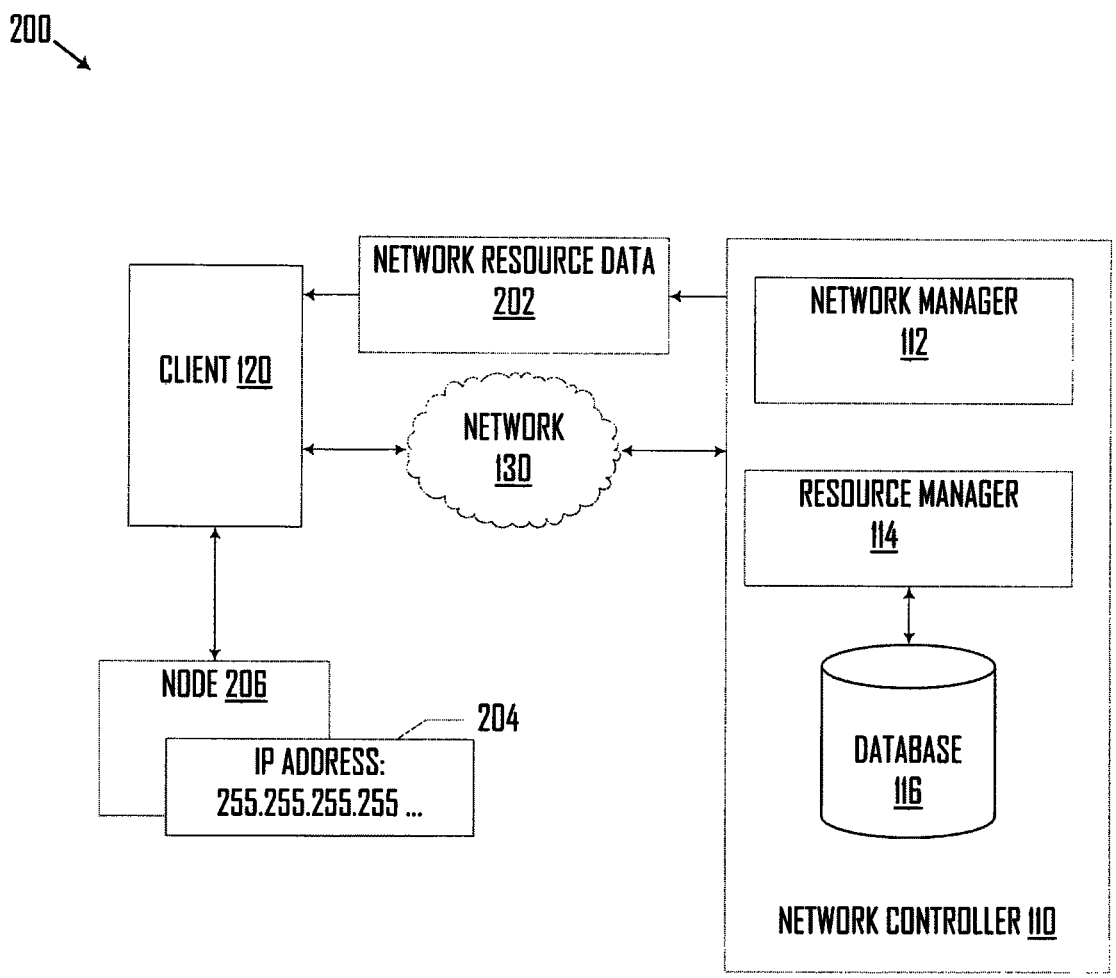
FIG. 2 is a simplified block diagram illustrating a system for providing network control and resource management, according to an embodiment.

FIG. 2 is a simplified block diagram illustrating a system 200 for providing network control and resource management, according to an embodiment. System 200 includes network controller 110 and client 120 connected to network 130.

Network controller 110 may transmit to client 120 network resource data 202 based on a request from client 120 for a network resource. In an example, network resource 202 includes a set of IP addresses 204 that network controller 110 has assigned to a node 206 launched by client 120. Network resource data 202 may also include other network resources. FIG. 2 may apply as well to other network resources such as subnet, port, and media access control (MAC) address.

In an example, database 116 stores a plurality of MAC addresses. A MAC address may refer to an identifier assigned to a network interface for communications on the physical network. Hosts on the network may be located by their IP addresses, and every host connected to the network may have a MAC address associated with the host's network interface. The MAC address may be mapped to the IP address (e.g., via address resolution protocol (ARP)). It may be undesirable for two nodes on the network to have the same MAC address because collisions of MAC addresses may, for example, prevent nodes on the network from receiving or transmitting data. Further, different MAC addresses may be assigned to nodes in a particular network, but conflicting MAC addresses may occur across domains.

In this example, the network resource that network controller 110 provides in response to the request for a network resource is a set of MAC addresses. Resource manager 114 may determine, based on the request for the network resource, a set of available MAC addresses from the plurality of MAC addresses stored in database 116. Database 116 may include a set of available MAC addresses and a set of unavailable MAC addresses. A MAC address may be unavailable if, for example, the MAC address has already been assigned. Resource manager 114 may search database 116 for available MAC addresses and identify the set of available MAC addresses.

In an example, network controller 110 may provide the set of available MAC addresses to the client and update the database based on providing the set of available MAC addresses to the client. For example, network controller 110 may indicate in the database that the set of MAC addresses that were provided to the client is no longer available to be assigned. After resource manager 114 identifies an available MAC address (e.g., from the identified set of available MAC addresses), network controller 110 may associate one or more of the available MAC address with the node such that the node may be located by the IP address associated with the node. When the node associated with the MAC address is removed from the network, the MAC address associated with the node may return to a pool of available MAC addresses. Accordingly, the MAC address that was associated with the node may be reassigned at a later point in time.

In an example, database 116 stores a plurality of subnets. A subnet may represent an IP address block (e.g., IPv4 or IPv6 address block) that may be used for assigning IP addresses to VM instances on a given network. Each subnet may be associated with a network and may be selected from an allocation pool of subnets.

In this example, the network resource that network controller 110 provides in response to the request for a network resource is a subnet. Resource manager 114 may determine, based on the request for the network resource, a subnet from the plurality of subnets stored in database 116. Database 116 may include a set of available subnets and a set of unavailable subnets. A subnet may be unavailable if, for example, the client associated with the request does not have permission to connect to the subnet. Resource manager 114 may search database 116 for available subnets and identify the available subnet to the client. In an example, network controller 110 may provide the available subnet to the client and update the database based on providing the subnet to the client. For example, network controller 110 may indicate in the database that the subnet that was provided to the client is no longer available to be assigned.

After resource manager 114 identifies an available subnet (e.g., from the identified set of available subnets), network controller 110 may associate one or more of the available subnets with the node such that the node may be connected to the subnet and communicate on the subnet. When the node associated with the subnet is removed from the network, the subnet associated with the node may return to a pool of available subnets. Accordingly, the subnet that was associated with the node may be reassigned at a later point in time.

In an example, database 116 stores a plurality of ports. A port may represent a virtual (or logical) switch port on a given network. In an example, a VM instance may attach its interface into one or more ports. In an embodiment, the logical port defines the MAC address and the IP address to be assigned to the interfaces plugged into the port. An IP address associated with a port may indicate that the port is associated with a subnet, as the IP address was taken from the allocation pool for a specific subnet. In an example, network controller 110 associates the port with a quality of service policy.

In this example, the network resource that network controller 110 provides in response to the request for a network resource is a set of ports. Resource manager 114 may determine, based on the request for the network resource, a set of available ports from the plurality of ports stored in database 116. Database 116 may include a set of available ports and a set of unavailable ports. A port may be unavailable if, for example, the port has already been assigned.

Resource manager 114 may search database 116 for available ports and identify the set of ports to the client. After resource manager 114 identifies an available port (e.g., from the identified set of available ports), network controller 110 may associate one or more of the available ports with the node such that the node may communicate via the port.

In an example, network controller 110 may provide the set of available ports to the client and update the database based on providing the set of available ports to the client. For example, network controller 110 may indicate in the database that the set of ports that were provided to the client is no longer available. When the node associated with the port is removed from the network, the port may be returned to a pool of available ports. Accordingly, the port that was associated with the node may be reassigned at a later point in time.

In another example, database 116 stores data associated with a plurality of networks, and the request for a network resource includes a virtual machine identifier associated with a virtual machine instance. Network controller 110 may determine, based on the virtual machine identifier, a set of networks available to the virtual machine instance. Network controller 110 may provide a network interface that binds the virtual machine instance to the set of networks and update the database based on providing the network interface.

As discussed above and further emphasized here, FIG. 1 is merely an example, which should not unduly limit the scope of the claims. For example, although block diagram 100 is described herein with reference to database 116 that stores the data associated with a network resource, other techniques to store this data are also within the scope of the disclosure. For example, network controller 110 may also include an audit log that includes information such as the dates on which network resources were created or requested and to whom they were assigned. And advantage of an audit log may enable an administrator to determine which network resources were associated with which tenants or virtual machines instances at a particular moment in time.

Further, it should be understood that one or more components (e.g., network manager 112 and resource manager 114) may be combined into a single component. It should also be understood that one or more components in FIG. 1 may be separated into more than one module. In an example, resource manager 114 is split into a first resource manager and a second resource manager.

IV. Example Method

Figure 3:
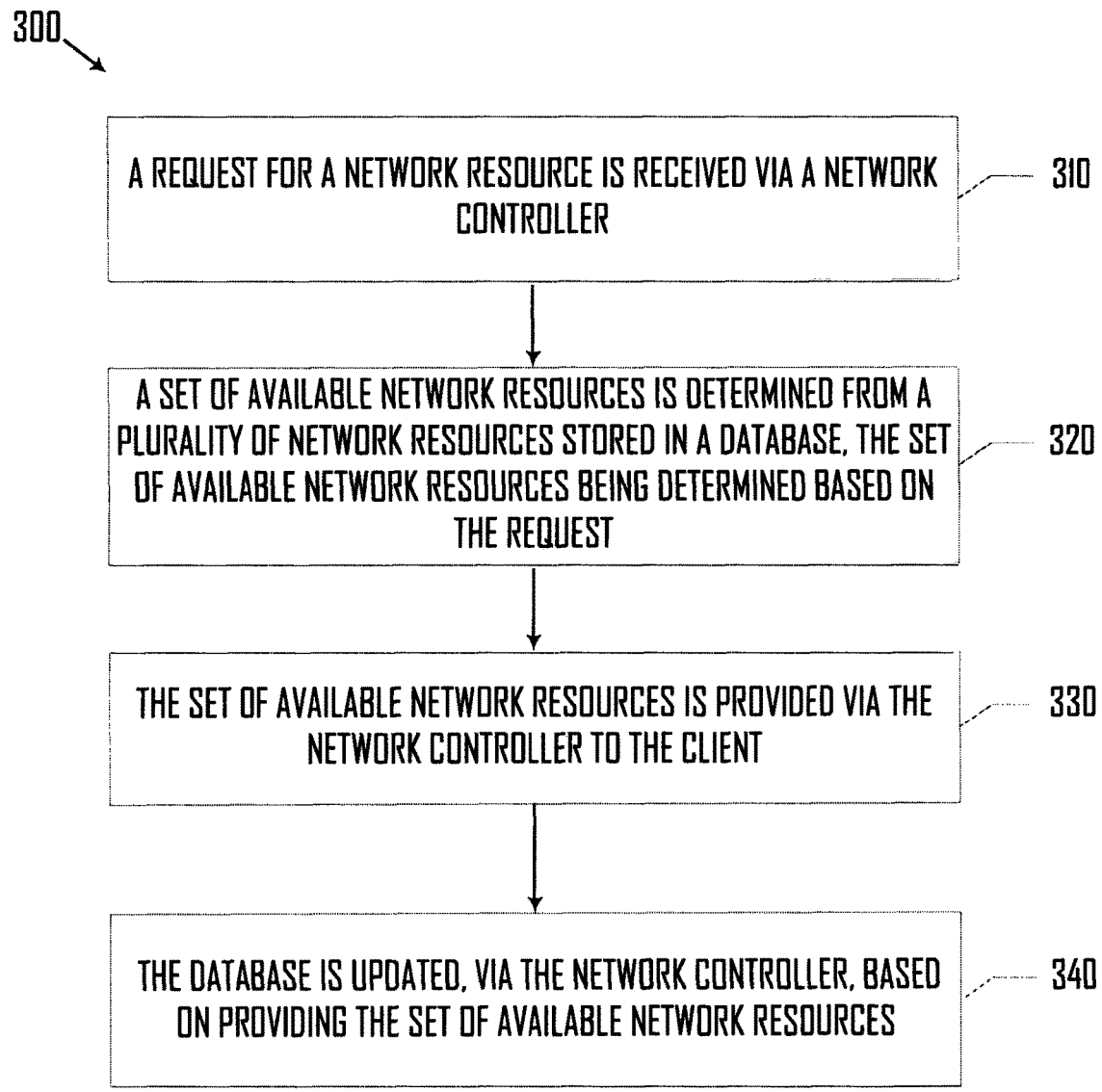
FIG. 3 is a flow chart showing a method of providing network control and resource management, according to an embodiment.

FIG. 3 is a flow chart showing a method 300 of providing network control and resource management, according to an embodiment. Method 300 is not meant to be limiting and may be used in other applications.

Method 300 includes steps 310-340. In a step 310, a request for a network resource is received via a network controller. In an example, network manager 112 receives a request for a network resource. In a step 320, a set of available network resources is determined from a plurality of network resources stored in a database, the set of available network resources being determined based on the request. In an example, resource manager 114 determines, based on the request, a set of available network resources from a plurality of network resources stored in a database.

In a step 330, the set of available network resources is provided, via the network controller, to the client. In an example, resource manager 114 provides, via the network controller, the set of available network resources to the client. In a step 340, the database is updated, via the network controller, based on providing the set of available network resources. In an example, resource manager 114 updates, via the network controller, the database based on providing the set of available network resources.

It is also understood that additional method steps may be performed before, during, or after steps 310-340 discussed above. For example, method 300 may include a step of associating the network resource with a node associated with the request. It is also understood that one or more of the steps of method 300 described herein may be omitted, combined, or performed in a different sequence as desired.

V. Example Computing System

Figure 4:
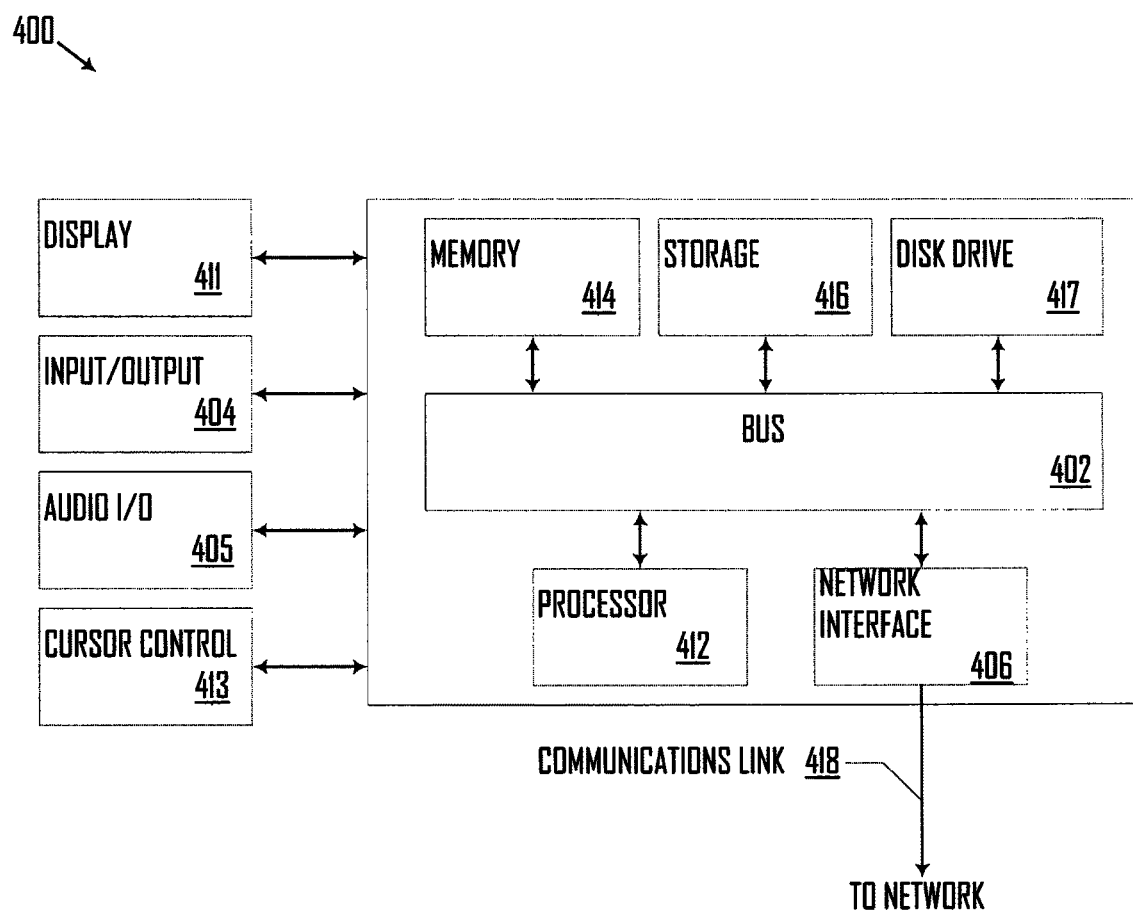
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, network controller 110 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. A processor 412, which may be a microcontroller, digital signal processor (DSP), or other processing component, processes these various signals, such as for display on computer system 400 or transmission to other devices via communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 100. In various other embodiments of the present disclosure, a plurality of computer systems 100 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. In an example, network controller 110 may be a software module running in a server. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for providing network control and resource management, the system comprising:
    a database to store a plurality of network resources in a memory, the plurality of network resources including a plurality of ports;
    a network controller that receives, by one or more hardware processors, a request for one or more ports, wherein the request is associated with a node, and wherein the network controller comprises a resource manager that:
        determines, based on the request, a set of available ports from the plurality of network resources;
        provides the set of available ports to a client, wherein the set of available ports includes at least two ports;
        updates the database based on providing the set of available ports to the client by providing an indication in the database that the set of ports is unavailable;
        associates, based on the request, at least one of the set of available ports with the node, the association being stored in the database, wherein the at least one port represents a logical port on a given network, wherein the logical port defines an internet protocol (IP) address and a media access control (MAC) address that is assigned to a set of interfaces plugged into the at least one port, and the set of interfaces of the node is attached to the at least one port, wherein after the at least one of the set of available ports is associated with the node, the node uses the at least one of the set of available ports to communicate;
        detects that the node has been removed from the given network;
        provides, based on the detection, an indication in the database that the set of ports is available;
        receives a second request for one or more ports, wherein the second request is associated with a second node;
        provides the set of available ports to a second client different from the client; and
        associates, based on the second request, the at least one of the set of available ports with the second node, wherein the at least one port represents a second logical port on the given network, wherein the second logical port defines a second IP address and a second MAC address that is assigned to a second set of interfaces plugged into the at least one port, and the set of interfaces of the second node is attached to the at least one port, wherein after the at least one of the set of available ports is associated with the second node, the second node uses the at least one of the set of available ports to communicate.

2. The system of claim 1, wherein the database stores a plurality of IP addresses, and the resource manager determines, based on a request for one or more IP addresses, a set of available IP addresses from the plurality of IP addresses, provides the set of available IP addresses to the client, updates the database based on providing the set of available IP addresses, and stores an association between the set of IP addresses and the node into the database.

3. The system of claim 1, wherein the database stores a plurality of MAC addresses, and the resource manager determines, based on a request for one or more MAC addresses, a set of available MAC addresses from the plurality of MAC addresses, provides the set of available MAC addresses to the client, updates the database based on providing the set of available MAC addresses, and stores an association between the set of MAC addresses and the node into the database.

4. The system of claim 1, wherein the database stores a plurality of subnet IP addresses associated with one or more IP addresses, and the resource manager determines, based on a request for one or more subnet IP addresses, a set of available subnet IP addresses from the plurality of subnet IP addresses, provides the set of available subnet IP addresses to the client, and updates the database based on providing the set of available subnet IP addresses.

5. The system of claim 1, wherein the database stores data associated with a plurality of networks, and the request for one or more ports includes a virtual machine identifier associated with a virtual machine instance, wherein the network controller determines, based on the virtual machine identifier, a set of networks available to the virtual machine instance, provides a network interface that binds the virtual machine instance to the set of networks, and updates the database based on providing the network interface.

6. The system of claim 5, wherein the network is a private network.

7. The system of claim 5, wherein the network is a public network.

8. The system of claim 5, wherein a port represents a virtual switch port on a network, and wherein a node is the virtual machine instance and attaches the instance's interface into the set of ports.

9. The system of claim 1, wherein the database includes a plurality of IP addresses, plurality of MAC addresses, a plurality of subnet IP address, a plurality of network names, a plurality of client identifiers, and a plurality of virtual machine identifiers,
wherein each client identifier is associated with a set of virtual machine identifiers, a set of IP addresses, a set of MAC addresses, a set of subnet IP address, the set of ports, and a set of network names,
and the network controller rebuilds routing tables based on the plurality of client identifiers, plurality of IP addresses, plurality of MAC addresses, plurality of subnet IP address, plurality of ports, and plurality of network names.

10. The system of claim 1, wherein the set of network resources is a set of IPv4 addresses or a set of IPv6 addresses.

11. The system of claim 1, wherein the database stores routing tables used to forward packets to their final destination addresses, and the network controller receives an indication that the routing tables have been deleted from the database, wherein in response to the indication that the routing tables have been deleted from the database, the network controller recreates the routing tables by obtaining one or more IP addresses, determining one or more MAC addresses associated with the one or more IP addresses, determining which IP addresses and MAC addresses are allowed to receive and transmit traffic on one or more ports, and storing an indication of which IP addresses and MAC addresses are allowed to receive and transmit traffic on one or more ports.

12. A method of providing network control and resource management, the method comprising:
receiving, via a network controller, a request for one or more ports, wherein the request is associated with a node;
determining, based on the request, a set of available ports from a plurality of network resources stored in a database;
providing, via the network controller, the set of available ports to a client;
updating the database based on providing the set of available ports to the client, wherein the updating includes providing an indication in the database that the set of ports is unavailable;
storing, based on the request, an association between at least one of the set of available ports and the node into the database, wherein the at least one port represents a logical port on a given network, wherein the logical port defines an internet protocol (IP) address and a media access control (MAC) address that is assigned to a set of interfaces plugged into the at least one port, and the set of interfaces of the node is attached to the at least one port, wherein after the at least one of the set of available ports is associated with the node, the node uses the at least one of the set of available ports to communicate;
detecting that the node has been removed from the given network;
providing, based on the detection, an indication in the database that the set of ports is available;
receiving a second request for one or more ports, wherein the second request is associated with a second node;
providing the set of available ports to a second client different from the client; and
associating, based on the second request, the at least one of the set of available ports with the second node, wherein the at least one port represents a second logical port on the given network, wherein the second logical port defines a second IP address and a second MAC address that is assigned to a second set of interfaces plugged into the at least one port, and the set of interfaces of the second node is attached to the at least one port, wherein after the at least one of the set of available ports is associated with the second node, the second node uses the at least one of the set of available ports to communicate.

13. The method of claim 12, further comprising:
identifying a node associated with the request; and
associating at least one of the set of available ports—with the node.

14. The method of claim 12, wherein the database stores a plurality of internet protocol (IP) addresses, the method further comprising:
determining, based on a request for one or more IP addresses, a set of available IP addresses from the plurality of IP addresses;
providing the set of available IP addresses to the client; and
updating the database based on providing the set of available IP addresses.

15. The method of claim 12, wherein the database stores a plurality of media access control (MAC) addresses, the method further comprising:
determining, based on the a request for one or more MAC addresses, a set of available MAC addresses from the plurality of MAC addresses;
providing the set of available MAC addresses to the client; and
updating the database based on providing the set of available MAC addresses.

16. The method of claim 12, wherein the database stores a plurality of subnet IP addresses associated with one or more IP addresses, the method further comprising:

determining, based on a request for one or more subnet IP addresses, a set of available subnet IP addresses from the plurality of subnet IP addresses;

providing the set of available subnet IP addresses to the client; and updating the database based on providing the set of available subnet IP addresses.

17. The method of claim 12, wherein the database stores data associated with a plurality of networks, the method further comprising:

identifying a virtual machine identifier in the request, the virtual machine identifier being associated with a virtual machine instance;

determining, based on the virtual machine identifier, a set of networks available to the virtual machine instance;

providing a network interface that binds the virtual machine instance to the set of networks; and updating the database based on providing the network interface.

18. The method of claim 17, further including:

attaching, via the virtual machine instance, the instance's network interface into the set of ports, wherein a port represents a virtual switch port on a network.

19. The method of claim 12, wherein the database includes a plurality of IP addresses, a plurality of MAC addresses, a plurality of subnet IP address, a plurality of network names, a plurality of client identifiers, and a plurality of virtual machine identifiers, and wherein each client identifier is associated with a set of virtual machine identifiers, a set of IP addresses, a set of MAC addresses, a set of subnet IP address, a set of ports, and a set of network names, the method further comprising:

rebuilding routing tables based on the plurality of client identifiers, plurality of IP addresses, plurality of MAC addresses, plurality of subnet IP address, plurality of ports, and plurality of network names.

20. A non-transitory machine-readable medium comprising a plurality of machine-readable instructions that when executed by one or more processors is adapted to cause the one or more processors to perform a method comprising:

receiving a request for one or more ports, wherein the request is associated with a node;

determining, based on the request, a set of available ports from a plurality of network resources stored in a database;

providing the set of available ports to a client;

updating the database based on providing the set of available ports to the client by providing an indication in the database that the set of ports is unavailable;

identifying the node associated with the request for one or more ports;

associating at least one of the set of available network resources with the node wherein after the at least one of the set of available ports is associated with the node, the node uses the at least one of the set of available ports to communicate;

storing, based on the request, the association between at least one of the set of available resources and the node into a database, wherein the at least one of the set of available resources represents a logical port on a given network, wherein the logical port defines an internet protocol (IP) address and a media access control (MAC) address that is assigned to a set of interfaces plugged into the at least one of the set of available resources, and the set of interfaces of the node is attached to the at least one of the set of available resources;

detecting that the node has been removed from the given network;

providing, based on the detection, an indication in the database that the set of ports is available;

receiving a second request for one or more ports, wherein the second request is associated with a second node;

providing the set of available ports to a second client different from the client; and associating, based on the second request, the at least one of the set of available ports with the second node, the association being stored in the database, wherein the at least one port represents a second logical port on the given network, wherein the second logical port defines a second IP address and a second MAC address that is assigned to a second set of interfaces plugged into the at least one port, and the set of interfaces of the second node is attached to the at least one port, wherein after the at least one of the set of available ports is associated with the second node, the second node uses the at least one of the set of available ports to communicate.

* * * * *